April 16, 1929.  J. B. RAUEN ET AL  1,709,487

MULTIPLE STAGE SPRING

Filed Feb. 5, 1925

Inventors
John B. Rauen.
William T. Sprong.
By Lyon & Lyon Attorneys

Patented Apr. 16, 1929.

1,709,487

UNITED STATES PATENT OFFICE.

JOHN B. RAUEN AND WILLIAM J. SPRONG, OF LOS ANGELES, CALIFORNIA, ASSIGNORS TO UNITED STATES SPRING COMPANY, INC., OF LOS ANGELES, CALIFORNIA, A CORPORATION OF CALIFORNIA.

MULTIPLE-STAGE SPRING.

Application filed February 5, 1925. Serial No. 6,963.

This invention relates to springs and is more particularly directed to multiple stage springs having a plurality of sets of spring steel means vertically disposed and connected. Multiple stage springs are particularly suited for use on heavy stages, trucks and the like, wherein a considerable load variation is encountered and such springs must be so designed and constructed that they will have substantially equal elasticity under all conditions of load in position. That is, the springs must be such that when the stage or truck is running under a light load, the springs will not be what is termed "dead", but must have a proportionately greater resiliency due to the lesser force which will be exerted thereon when the stage or truck or the like encounters ruts or depressions in the roadway.

It is therefore an object of this invention to provide a multiple stage spring adapted to be employed on stages, trucks and the like, which is so designed as to properly accommodate the load variation so as to maintain substantial equal elasticity of the springs under all conditions encountered.

It is an object of this invention to provide a multiple stage spring of such design and construction as to absorb the rebound shock exhibited in the springs when the same are subjected to a sudden and violent depressing force.

It is an object of this invention to provide a multiple stage spring having a plurality of sets of spring steel leaves vertically disposed that is free from weak sections that require a relatively slight depressing force to shear the spring leaves at these sections.

Other objects and advantages of this invention will be apparent from the following detailed description of a preferred embodiment thereof as illustrated in the accompanying drawings.

Figure 1:
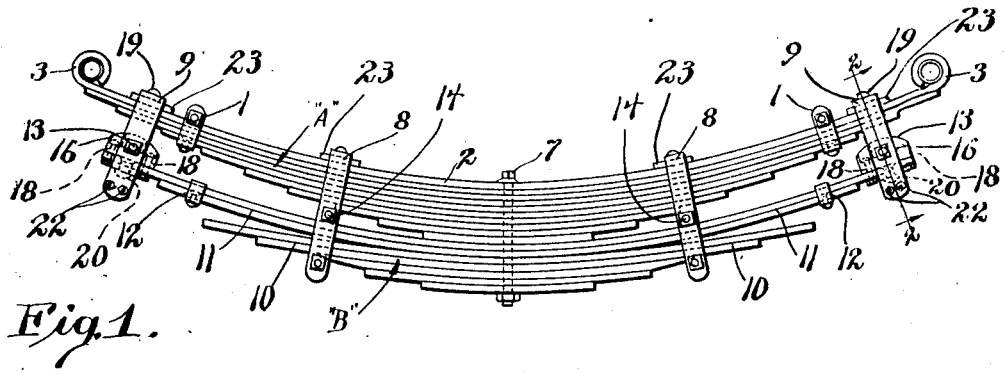
Fig. 1 is a side elevation of a multiple stage spring embodying this invention.

In the preferred form of this invention shown in the drawings, A illustrates an upper set of leaves of spring steel held together by means of spring clips 1, the upper leaf 2 of which is curved to form eyes 3 adapted to be connected to supporting brackets 4 and spring shackles 5 by means of pins 6. The set A is connected to a second set of spring steel leaves B at its center by means of a bolt 7 at points spaced from the center by means of clips 8 and at points spaced from the ends of the upper leaf 2 by means of clips 9. The sets of leaves of spring steel of the set B are divided into two portions 10 and 11 and the portions 10 and 11 of spring steel leaves of the set B are of normally less curvature than the spring steel leaves of the set A, and the portion 11 of the set B is forced into substantially the same curvature as the curvature of the leaves of the set A by means of the end clips 9. The leaves of the portion 11 are tied together by means of clips 12 spaced from the end of the longest leaf of the portion 10. The leaves of the portion 11 being sprung into substantially the same curvature as the leaves of the set A, tend to exert a force downward upon the leaves of the set A when the same is subjected to no load, or a relatively light load, and as the load on the spring increases the downward depressing force exerted by the portion 11 is released from the leaves of the set A and a further depressing force on the spring is acting entirely upon the leaves of the set A.

As the load increases and as the clips 9 are provided with clamping bolts 13 and the clips 8 are provided with clamping bolts 14, the depressing force upon the spring is resisted by the force exerted by the spring leaves of the set B as well as by the resistance offered by the sets of leaves of the springs A so that it will be seen that with increasing load, increasing resistance to the depressing force is offered by this spring until all of the leaves of the sets A and B are brought into play. From this standpoint, it will be obvious that a third or a greater number of like sets A and B could be similarly disposed to form a multiple stage spring according to the same principle as herein set forth.

Figure 3:
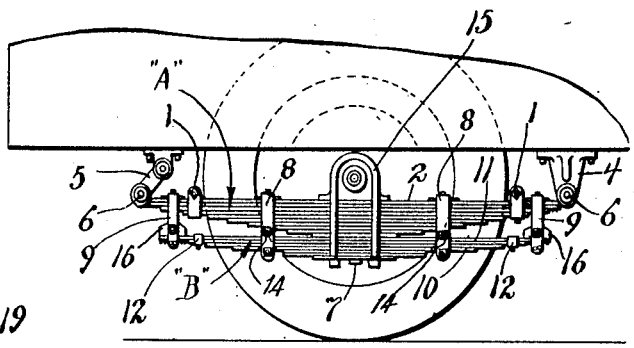
Fig. 3 is a side elevation of a multiple stage spring embodying this invention, illustrating the same as connected to a fragment of a truck or stage spring in position to support one of the axles.
Figure 2:
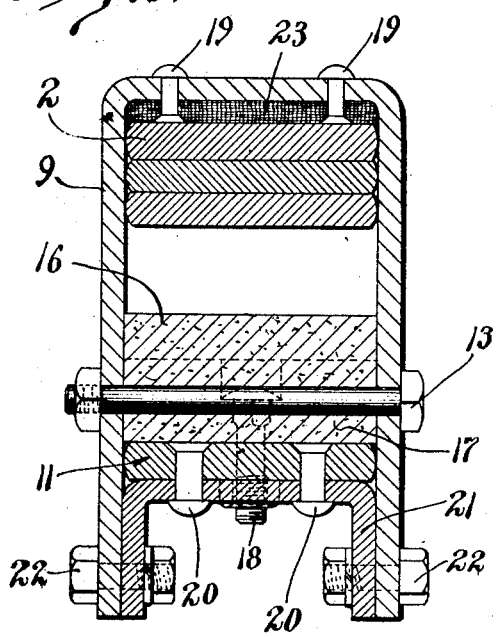
Fig. 2 is a central end elevation thereof, taken substantially on the line 2—2 of Fig. 1.

When the spring is subjected to a sudden depressing shock (the condition of curvature of the spring being under normal load substantially that illustrated in Fig. 1), the spring is depressed to a condition into a form as illustrated in Fig. 3 and the portions 10 and 11 of the set of spring steel leaves B acts to break or prevent the rebound tendency normally found in the springs. The spring may be secured to the axle of the vehicle by any suitable means, such as the U-bolt 15 illustrated in Fig. 3. Under heavy load the spring leaves of both the sets A and B may spread as illustrated in Fig. 3 and the curvature of the leaves of the spring set B, will offer a greater resistance to a depressing shock or force upon the spring, and the leaves of the spring set B will only come into use after the leaves of the spring set A have been depressed a certain degree.

In order to prevent the leaves of the set A being depressed upon and clapping against the portion 11 of the set B, buffers 16 are mounted within the clips 9 on the clamping bolts 13, the clamping bolts 13 being passed through the buffers 16 provide a cushion portion 17 between the upper leaf of the portion 11 and the bolt 13 so as to prevent chattering. The buffer 16 is also held in position by means of bolts 18 which are passed therethrough and through the upper leaf of the portion 11. The clip 9 is secured to the plate 23 above the upper set A by means of rivets 19 and is secured to the portion 11 of the set B by means of the rivets 20 which pass through the upper leaf of the portion 11 and through the channel iron 21 which is secured to the side member of the clip 9 by means of bolts 22.

Having fully described a preferred embodiment of this invention, it is to be understood that it is not intended that this invention should be limited to the exact construction herein set forth, but is of the scope of the appended claims.

We claim:

1. A multiple stage spring comprising a plurality of sets of spring steel leaves mounted one upon the other, of substantially equal length, the leaves of the upper set being of greater curvature when the spring is not loaded than the leaves of the lower set, and means for clamping a portion of the leaves of the lower set to the upper set so as to force the leaves of the said portion into substantially equal curvature with the first set of leaves.

2. A multiple stage spring comprising a plurality of sets of spring steel leaves mounted one upon the other, the leaves of the upper set being of greater curvature when the spring is not loaded than the leaves of the lower set, means for clamping the portion of the leaves of the lower set to the upper set so as to force the leaves of the said portion into substantially equal curvature with the upper set of leaves.

3. A multiple stage spring comprising a plurality of sets of spring steel leaves mounted one upon the other, the leaves of the upper set being of greater curvature when the spring is not loaded than the leaves of the lower set, and means for clamping the portion of the leaves of the lower set to the upper set so as to force the said portion of said leaves into substantial equal curvature with the first set of leaves, and buffers positioned on the said lower set of leaves to prevent the upper set of leaves from striking the lower set when subjected to a sudden depressing force.

4. A multiple stage spring, comprising a plurality of sets of spring steel leaves mounted one upon the other, means for securing the ends of a portion of the leaves of a lower set to an upper set so that the said leaves of the lower set are bent to a curvature greater than the remaining leaves of the said lower set.

5. A multiple stage spring, comprising a plurality of sets of spring steel leaves mounted one upon the other, means for holding the springs of the respective sets in vertical alignment, means for clamping a portion of the leaves of a lower set of leaves to an upper set of leaves at the ends of the said leaves so that the said leaves of the lower set are bent to a curvature greater than the remaining leaves of the said lower set.

6. A multiple stage spring comprising a plurality of sets of spring leaves mounted one upon the other, means for securing said springs together near their longitudinal center, means secured to a portion of the lower set of leaves near the end thereof to the upper set of springs, and means between the said center securing means and end securing means for securing the lower set of leaves to the upper set of leaves.

7. In a multiple stage spring, the combination of a plurality of sets of spring steel leaves mounted one upon the other, each of said sets comprising a plurality of independent leaves of progressively shorter length toward the bottom of the set, means for securing the respective sets of leaves in vertical alignment, means for securing a portion of the longer leaves of the lower set to the upper set, and buffers secured at substantially the ends of the lower set of leaves in position to be engaged by the leaves of the upper set of leaves when the spring is subjected to a sudden depressing force.

8. In a compound spring, a main spring having a plurality of leaves, an auxiliary spring having a plurality of leaves, floating clips secured to the ends of the spring for permitting limited free movement of the ends of one spring relative to the ends of the other spring, the clips interconnecting associated ends of both springs to give maximum flexibility for light loads and increased stiffness by the progressive action of the leaves of both springs as the load increases, cushioning members located between the ends of the springs for absorbing the energy of the vertical movements of the load and reducing the rebound of the load.

Signed at Los Angeles, California, this 29 day of January 1925.

JOHN B. RAUEN.
WILLIAM J. SPRONG.